(12) United States Patent
Tanna (10) Patent No.: US 10,954,317 B2
(45) Date of Patent: Mar. 23, 2021

(54) PROCESS FOR PREPARING ALKALI METAL SALT OF CARBOXYALKYL ETHER OF TAMARIND GUM (71) Applicant: Raj Mahendra Tanna, Maharashtra (IN)

(72) Inventor: Raj Mahendra Tanna, Maharashtra (IN)

( * ) Notice: Subject to any disclaimer, the term of this patent is extended or adjusted under 35 U.S.C. 154(b) by 0 days.

(21) Appl. No.: 16/616,074

(22) PCT Filed: May 10, 2019

(86) PCT No.: PCT/IB2019/053855
§ 371 (c)(1),
(2) Date: Nov. 22, 2019

(87) PCT Pub. No.: WO2020/026041
PCT Pub. Date: Feb. 6, 2020

(65) Prior Publication Data
US 2020/0407469 A1 Dec. 31, 2020

(30) Foreign Application Priority Data

Jul. 28, 2018 (IN) .............................. 201821028444

(51) Int. Cl.
*C08B 37/00* (2006.01)
(52) U.S. Cl.
CPC ...... *C08B 37/0087* (2013.01); *C08B 37/0003* (2013.01)

(58) Field of Classification Search
None
See application file for complete search history.

(56) References Cited

PUBLICATIONS

Asano, JP 02099502 A, Apr. 11, 1990, machine translation. (Year: 1990).*

* cited by examiner

*Primary Examiner* — Layla D Berry
(74) *Attorney, Agent, or Firm* — Rothwell, Figg, Ernst & Manbeck. P.C.

(57) ABSTRACT

The present disclosure relates to a process for preparing alkali metal salt of carboxyalkyl ether of tamarind gum with one or more improved properties like improved viscosities and electrolytic stability. Particularly the present disclosure provides a process for preparing alkali metal salt of carboxyalkyl ether of tamarind gum comprising:
(a) permeating a pulverized tamarind gum powder by mercerizing said pulverized tamarind gum powder in the presence of an alkali, and a non-aqueous organic polar solvent present in an amount of at least 2 times the amount of the tamarind gum v/w;
(b) carrying out etherification of alkali-tamarind gum with etherifying agent to provide an alkali metal salt of carboxyalkyl ether of tamarind gum;
in which, steps of mercerizing the pulverized tamarind gum powder and etherification are carried out separately or simultaneously.

13 Claims, 6 Drawing Sheets

```
┌─────────────────────────────────────────────────────────────┐
│ Permeating pulverized tamarind gum powder by mercerizing,   │
│ and etherifying of alkali-tamarind gum in the presence of a │
│ non-aqueous organic polar solvent (2-10 times the amount of │
│ the tamarind gum v/w),with etherifying agent and            │
│ stoichiometric excess of alkali to provide an alkali metal salt │
│ of carboxyalkyl ether of tamarind gum.                      │
│ Reaction temperature: 25-85 °C                              │
│ Agitation for 90-650 mins.                                  │
└─────────────────────────────────────────────────────────────┘
                              │
                              ▼
┌─────────────────────────────────────────────────────────────┐
│ Separating alkali metal salt of carboxyalkyl ether of tamarind │
│ gum from the reaction mixture e.g. centrifugation           │
│ @ 400 – 800 rpm for 30-150 mins.                            │
└─────────────────────────────────────────────────────────────┘
                              │
                              ▼
┌─────────────────────────────────────────────────────────────┐
│ Optionally vacuum drying the separated alkali metal salt of │
│ carboxyalkyl ether of tamarind gum at 45-85 °C for 100-300  │
│ mins.                                                       │
└─────────────────────────────────────────────────────────────┘
                              │
                              ▼
┌─────────────────────────────────────────────────────────────┐
│ Optionally blending the alkali metal salt of carboxyalkyl ether │
│ of tamarind gum powder to obtain uniform constitution at 45- │
│ 85 °C for 90-300 mins.                                      │
└─────────────────────────────────────────────────────────────┘
                              │
                              ▼
┌─────────────────────────────────────────────────────────────┐
│ Optionally sieving using 270 Mesh Sieve, to provide at least │
│ 90% of the alkali metal salt of carboxyalkyl ether of tamarind │
│ gum powder passing through 270 Mesh.                        │
└─────────────────────────────────────────────────────────────┘
```

Figure 1

```
┌─────────────────────────────────────────────────────────────┐
│ Permeating pulverized tamarind gum powder by mercerizing    │
│ in the presence of alkali and a non-aqueous organic polar   │
│ solvent (2-10 times the amount of the tamarind gum v/w);    │
│ etherifying of alkali-tamarind gum with etherifying agent to│
│ provide an alkali metal salt of carboxyalkyl ether of tamarind│
│ gum.                                                        │
│ Reaction temperature: 25-85 °C                              │
│ Agitation for 90-550 mins.                                  │
└─────────────────────────────────────────────────────────────┘
                              ↓
┌─────────────────────────────────────────────────────────────┐
│ Separating alkali metal salt of carboxyalkyl ether of tamarind│
│ gum from the reaction mixture e.g. centrifugation           │
│ @ 400 – 800 rpm for 100-250 mins.                           │
└─────────────────────────────────────────────────────────────┘
                              ↓
┌─────────────────────────────────────────────────────────────┐
│ Vacuum drying the separated alkali metal salt of carboxyalkyl│
│ ether of tamarind gum at 45-85 °C for 100-150 mins.         │
└─────────────────────────────────────────────────────────────┘
                              ↓
┌─────────────────────────────────────────────────────────────┐
│ Blending the alkali metal salt of carboxyalkyl ether of     │
│ tamarind gum powder to obtain uniform constitution at 45-85 │
│ °C for 100-250 mins.                                        │
└─────────────────────────────────────────────────────────────┘
                              ↓
┌─────────────────────────────────────────────────────────────┐
│ Optionally sieving using 270 Mesh Sieve, to obtain the more │
│ than 92% of alkali metal salt of carboxyalkyl ether of      │
│ tamarind gum powder passing through 270 Mesh sieve.         │
└─────────────────────────────────────────────────────────────┘
```

PROCESS FOR PREPARING ALKALI METAL SALT OF CARBOXYALKYL ETHER OF TAMARIND GUM

CROSS REFERENCE TO RELATED APPLICATION(S)

The present application is a 35 U.S.C. § 371 National Phase Entry Application from PCT/IB2019/053855, filed on May 10, 2019, which claims the benefits of priority to Indian Patent Application No. 201821028444, filed Jul. 28, 2018, which are incorporated herein by reference in their entirety for all purposes.

FIELD OF THE INVENTION

The present disclosure pertains to technical field of providing alkali metal salt of carboxyalkyl ether of tamarind gum with improved properties that may include higher purities, viscosities and electrolytic stability. More particularly the present disclosure relates to an improved process for preparing alkali metal salt of carboxyalkyl ether of tamarind gum.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Tamarind gum has wide applications in the fields of pharmaceutical, cosmetic, Textile manufacturing, Paper Manufacturing, Water based paint manufacturing, Construction Chemical, and food. In the recent years, it is widely tested and employed in various drug delivery applications as effective pharmaceutical excipients, textile printing thickener, and many other applications. However, it has some potential drawbacks such as unpleasant odor, dull color, tendency of fast Bio-degradability in aqueous environment. Also, it is extremely difficult to dissolve, as it is not cold water soluble and requires high temperature to completely homogenize it as a viscous solution requiring long periods of soaking before they can be thoroughly dispersed. This is a particular disadvantage where an aqueous solution of such gum is desired to be prepared using room temperature water and wherein a good shelf life of such a product is desired. In addition such gums frequently do not disperse and solubilise completely, and solutions of commercially available gums are usually turbid and contain suspended solid particles. Moreover, such solutions are usually fairly viscous and exhibit undesirably poor flow rheology at high viscosities accordingly incapable of filtrating through very fine mesh size pores for removal of the insoluble solids.

To overcome these restrictions, tamarind gum has been functionally derivatized through chemical treatment with a variety of functional groups such as carboxymethyl, acetal, hydroxyl alkyl, thiol, polymer grafting, etc. In general carboxyalkylated derivatives of tamarind gum are synthesized from the native gum through functional modification. Recently, in the polymer research, carboxyalkyl modifications gums are extensively studied conversion. Such functionally derivatized tamarind gums hold a great promise because of its improved stability, lower bio-degradability, flow rheology, cold water solubility, controlled particle size, improved Purity & mechanical behavior as well as competence in prolonged period-controlling drug releases.

It has now been discovered that carboxyalkyl ethers, and especially alkali metal salts of the carboxyalkyl ethers of tamarind gum are readily dispersible and form solutions of excellent clarity.

In general, functionalized derivatives of tamarind gum are synthesized through the conventional method by Williamson's etherification reaction using monochloroacetic acid and sodium hydroxide in the aqueous milieu at higher temperature. However, the Williamson's etherification reaction suffers from the disadvantage that it may direct to the nonspecific degradation via β elimination and/or peeling reaction initiated at decreasing sugar units because of highly alkaline pH environment, which sequentially decreases the molecular weight of the derivatized gum.

The aqueous medium method has been practiced for many years for synthesizing derivatized tamarind gum also suffers from shortcomings. In this method, the ratio of effective utilization of the etherifying agent (the ratio of (a) the amount of the etherifying agent that becomes bonded to the Tamarind, to (b) the amount of the etherifying agent initially charged) is high. However, due to non-purification slurry method the level of impurities are rather high and a high viscosity polymer is not achieved, such functionalized derivative exhibits poor pseudo plastic flow, low stability to electrolytes and poor filterability.

To overcoming such disadvantages, a solvent based method was attempted as a method characterized by a high effective utilization ratio of monochloroacetic acid used as etherifying agent, and a non-water containing inorganic polar solvent, in presence of alkali. In this method, the amount of the solvent required was from 2 to 10 times the amount of the tamarind gum. As per the conventional powder reaction process or water medium method an organic non-polar solvent was used in an amount at least 30 times the weight of the tamarind gum or dry blending at high temperature processed. Thus, in the solvent based method, a high effective utilization ratio of monochloroacetic acid could be attained, but it was difficult to obtain functionalized derivative having a high viscosity due to reduction in side reaction property. Thus, this method too suffered from limitations.

It is known that the flow characteristics of functionalized derivatives of tamarind gum are generally influenced by the distribution of the substituents introduced by the etherification. Accordingly, attempts were made to obtain improved viscosity characteristics However, in these attempts, the ratio of the amount used of the alkali increased and the effective utilization ratio of the monochloroacetic acid was reduced leading to further depolymerization of the main chain of the tamarind gum and therefore, the performance advantage inherent in the non polar solvent, water solvent, and dry blending methods is lost.

The flow characteristics, namely the viscosity characteristics of functionalized derivatives of tamarind gum are found to be influenced by the manufacturing conditions, but according to process conditions for providing functionalized derivatives of tamarind gum having high viscosity characteristics, solubility in cold water, filterability, flow characteristics, stability to acids, alkalis, and electrolytes, and other desired requisite characteristics important for various industrial applications have not yet been achieved with the conventional methods and other approaches attempted. Lack of various desired properties of functionalized derivatives of tamarind gum has also imposed limitations on exploiting it for newer applications.

Accordingly, there exists a need in the art for a simple, cost effective, and industrially applicable process for synthesizing alkali metal salt ether of carboxyalkyl tamarind gum with higher purities, viscosities and electrolytic stability suitable for industrial applications.

OBJECTS OF THE INVENTION

It is an object of the present disclosure to provide a process for preparing alkali metal salt ether of carboxyalkyl tamarind gum that can overcome one or more problems or disadvantages associated with the conventional synthetic method.

It is an object of the present disclosure to provide a process for economically and efficiently derivatize and provide a high viscosity, cold water soluble, pseudo-anionic derivative of a tamarind gum.

It is a further object of the present disclosure to provide an improved process for preparing alkali metal salt of carboxyalkyl ether of tamarind gum with one or more improved properties.

It is another object of the present disclosure to provide a process for preparing alkali metal salt of carboxyalkyl ether of tamarind gum with one or more improved characteristic(s) including improved viscosities and electrolytic stability.

It is yet another object of the present disclosure to provide an alkali metal salt of carboxyalkyl ether of tamarind gum with one or more characteristic(s) selected from pseudo-plastic flow property in aqueous solutions, increased viscosity at lower concentrations, high resistance to drop in viscosity in presence of electrolytes, high resistance to drop in viscosity in presence of concentrated acids, high resistance to drop in viscosity in presence of strong alkali, ability to hydrate and hold viscosity under a pH range from pH 1 to pH 14.

It is yet another object of the present disclosure to provide an alkali metal salt of carboxyalkyl ether of tamarind gum suitable for industrial applications.

SUMMARY OF THE INVENTION

In a general aspect the present disclosure provides an improved process for derivatizing tamarind gum.

In an aspect the present disclosure provides a process for preparing alkali metal salt of carboxyalkyl ether of tamarind gum with one or more improved properties.

In one aspect the present disclosure provides a process for preparing alkali metal salt of carboxyalkyl ether of tamarind gum with one or more improved characteristic(s) including improved viscosities and electrolytic stability.

In an aspect the present disclosure provides a process for preparing alkali metal salt of carboxyalkyl ether of tamarind gum comprising: derivatizing tamarind gum; and purifying the derivatized gum to provide a high viscosity, cold water soluble, pseudo-anionic derivative of tamarind gum.

In one aspect the present disclosure provides a process for preparing alkali metal salt of carboxyalkyl ether of tamarind gum comprising:

(a) permeating a pulverized tamarind gum powder by mercerizing said pulverized tamarind gum powder in the presence of an alkali, and a non-aqueous organic polar solvent present in an amount of at least 2 times the amount of the tamarind gum v/w;

(b) carrying out etherification of alkali-tamarind gum with etherifying agent to provide an alkali metal salt of carboxyalkyl ether of tamarind gum;

in which, steps of mercerizing the pulverized tamarind gum powder and etherification are carried out separately or simultaneously.

In another aspect the present disclosure provides a process for preparing alkali metal salt of carboxyalkyl ether of tamarind gum comprising:

(a) permeating a pulverized tamarind gum powder by mercerizing said pulverized tamarind gum powder in the presence of an alkali, and a non-aqueous organic polar solvent present in an amount of at least 2 times the amount of the tamarind gum v/w; and (b) carrying out etherification of alkali-tamarind gum with an etherifying agent to provide an alkali metal salt of carboxyalkyl ether of tamarind gum.

In yet another aspect the present disclosure provides a process for preparing alkali metal salt of carboxyalkyl ether of tamarind gum comprising: permeating a pulverized tamarind gum powder by mercerizing said pulverized tamarind gum powder; and etherifying the pulverized tamarind gum powder in a non-aqueous organic polar solvent present in an amount of at least 2 times the amount of the tamarind gum v/w, with an etherifying agent, in the presence of a stoichiometric excess of an alkali.

In an aspect the present disclosure provides an alkali metal salt of carboxyalkyl ether of tamarind gum with one or more characteristic(s) selected from pseudo-plastic flow property in aqueous solutions, increased viscosity at lower concentrations, high resistance to drop in viscosity in presence of electrolytes, high resistance to drop in viscosity in presence of concentrated acids, high resistance to drop in viscosity in presence of strong alkali, ability to hydrate and hold viscosity under a pH range from pH 1 to pH 14.

In an aspect the present disclosure provides an alkali metal salt of carboxyalkyl ether of tamarind gum suitable for industrial application for example use in textile printing pastes.

Various objects, features, aspects and advantages of the inventive subject matter will become more apparent from the following detailed description of preferred embodiments.

BRIEF DESCRIPTION OF THE ACCOMPANYING DRAWING

Characteristics and advantages of the subject matter as disclosed in the present disclosure will become clearer from the detailed description of an embodiment thereof, with reference to the attached drawing, given purely by way of an example, in which.

DETAILED DESCRIPTION OF THE INVENTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein.

All processes described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

It should also be appreciated that the present disclosure can be implemented in numerous ways, including as a method or a system. In this specification, these implementations, or any other form that the invention may take, may be referred to as processes. In general, the order of the steps of the disclosed processes may be altered within the scope of the invention.

Various terms are used herein and claimed. To the extent a term used in a claim is not defined below, it should be given the broadest definition persons in the pertinent art have given that term as reflected in printed publications and issued patents at the time of filing.

Reference will now be made in detail to the exemplary embodiments of the present disclosure, examples of which are illustrated in the accompanying drawings.

The description that follows, and the embodiments described therein, is provided by way of illustration of an example, or examples, of particular embodiments of the principles and aspects of the present disclosure. These examples are provided for the purposes of explanation, and not of limitation, of those principles and of the disclosure.

The present disclosure relates to a process for economically and efficiently derivatizing and providing a standardized high viscosity, cold water soluble, pseudo-anionic derivative of a tamarind gum.

In an embodiment, the present disclosure provides an improved process for derivatizing tamarind gum.

In an embodiment, the present disclosure provides an improved process for preparing alkali metal salt of carboxyalkyl ether of tamarind gum with one or more improved properties.

In an embodiment, the present disclosure provides a process for preparing alkali metal salt of carboxyalkyl ether of tamarind gum with one or more improved characteristic(s) including higher purities, viscosities and electrolytic stability.

In an embodiment, the present disclosure provides a process for preparing alkali metal salt of carboxyalkyl ether of tamarind gum comprising: derivatizing tamarind gum; and purifying the derivatized gum to provide a high viscosity, cold water soluble, pseudo-anionic derivative of tamarind gum.

In an embodiment the present disclosure provides a process for preparing alkali metal salt of carboxyalkyl ether of tamarind gum comprising: derivatizing tamarind gum; and purifying the derivatized gum to provide a high viscosity, cold water soluble, pseudo-anionic derivative of tamarind gum.

In one embodiment the present disclosure provides a process for preparing alkali metal salt of carboxyalkyl ether of tamarind gum comprising:
(a) permeating a pulverized tamarind gum powder by mercerizing said pulverized tamarind gum powder in the presence of an alkali, and a non-aqueous organic polar solvent present in an amount of at least 2 times the amount of the tamarind gum v/w;
(b) carrying out etherification of alkali-tamarind gum with etherifying agent to provide an alkali metal salt of carboxyalkyl ether of tamarind gum;
in which, steps of mercerizing the pulverized tamarind gum powder and etherification are carried out separately or simultaneously.

In one embodiment the present disclosure provides a process for preparing alkali metal salt of carboxyalkyl ether of tamarind gum comprising:
(a) permeating a pulverized tamarind gum powder by mercerizing said pulverized tamarind gum powder in the presence of an alkali, and a non-aqueous organic polar solvent present in an amount of at least 2 times the amount of the tamarind gum v/w;
(b) carrying out etherification of alkali-tamarind gum with etherifying agent to provide an alkali metal salt of carboxyalkyl ether of tamarind gum;
in which, steps of mercerizing the pulverized tamarind gum powder and etherification are carried out separately or simultaneously and the process optionally further comprises step(s) including separating the alkali metal salt of carboxyalkyl ether of tamarind gum from the reaction mixture; drying the separated alkali metal salt of carboxyalkyl ether of tamarind gum; blending the dried alkali metal salt of carboxyalkyl ether of tamarind gum; sieving the dried alkali metal salt of carboxyalkyl ether of tamarind gum through sieve of appropriate pore size to obtain the dry powder of alkali metal salt of carboxyalkyl ether of tamarind gum with desired particle size.

In another embodiment the present disclosure provides a process for preparing alkali metal salt of carboxyalkyl ether of tamarind gum comprising:
(a) permeating a pulverized tamarind gum powder by mercerizing said pulverized tamarind gum powder in the presence of an alkali, and a non-aqueous organic polar solvent present in an amount of at least 2 times the amount of the tamarind gum v/w; and
(b) carrying out etherification of alkali-tamarind gum with an etherifying agent to provide an alkali metal salt of carboxyalkyl ether of tamarind gum.

In yet another embodiment the present disclosure provides a process for preparing alkali metal salt of carboxyalkyl ether of tamarind gum comprising: permeating a pulverized tamarind gum powder by mercerizing said pulverized tamarind gum powder; and etherifying the pulverized tamarind gum powder in a non-aqueous organic polar solvent present in an amount of at least 2 times the amount of the tamarind gum v/w, with an etherifying agent, in the presence of a stoichiometric excess of an alkali.

The expression "stoichiometric excess of an alkali" means the alkali used is in excess amount in relation to other agents like etherifying agent.

In one embodiment the present disclosure provides a process for preparing alkali metal salt of carboxyalkyl ether of tamarind gum comprising:
(a) permeating a pulverized tamarind gum powder by mercerizing said pulverized tamarind gum powder in the presence of an alkali, and a non-aqueous organic polar solvent present in an amount of at least 2 times the amount of the tamarind gum v/w:
(b) carrying out etherification of alkali-tamarind gum with etherifying agent to provide an alkali metal salt of carboxyalkyl ether of tamarind gum;
(c) separating the alkali metal salt of carboxyalkyl ether of tamarind gum from the reaction mixture;
(d) drying the separated alkali metal salt of carboxyalkyl ether of tamarind gum;
(e) blending the dried alkali metal salt of carboxyalkyl ether of tamarind gum; and
(f) sieving the dried alkali metal salt of carboxyalkyl ether of tamarind gum through sieve of appropriate pore size to obtain the dry powder of alkali metal salt of carboxyalkyl ether of tamarind gum with desired particle size.

The starting tamarind gum to be used in the process for preparing alkali metal salt of carboxyalkyl ether of tamarind gum is tamarind gum powder available commercially as unrecognizable and physically inseparable form. In an embodiment the tamarind gum powder is pulverized tamarind gum powder having particles size of 100 mesh to 400 mesh. In an embodiment the tamarind gum powder is pulverized tamarind gum powder having particles size of 100 mesh to 300 mesh. In an embodiment the tamarind gum powder is pulverized tamarind gum powder having particles size of 200 mesh to 300 mesh.

The non-aqueous organic polar solvent is the solvent which does not contain water or not mixed with water.

The polar solvent that can be used in the process is selected from alcohol(s) including the alcohol(s) having 1 to 4 carbon atoms; and ketone(s) including the ketone(s) having 3 to 5 carbon atoms; or mixtures thereof; wherein the alcohol is selected from but not limited to methyl alcohol, ethyl alcohol, n-propyl alcohol, isopropyl alcohol, n-butyl alcohol and isobutyl alcohol; and the ketone is selected from but not limited to acetone and methylethyl ketone, or the like.

In an embodiment, the polar solvent optionally may include aromatic hydrocarbons having 6 to 8 carbon atoms including but not limited to benzene and toluene. In an embodiment, the polar solvent optionally may include semi-polar, or non-polar organic solvent.

The amount of non-aqueous organic polar solvent used is in an amount sufficient to impart a good flowability to the reaction mixture slurry formed after adding the tamarind gum. The amount of non-aqueous organic polar solvent used is such that the weight ratio of the solvent to the starting tamarind gum is not excessively high. The amount of non-aqueous organic polar solvent used is in an amount of at least 2 times the weight of the starting tamarind gum v/w.

In an embodiment the amount of non-aqueous organic polar solvent used can be in an amount of at least 5 times the weight of the tamarind gum v/w.

In an embodiment the amount of non-aqueous organic polar solvent used can be in an amount of 2-25 times the weight of the tamarind gum v/w.

In an embodiment the amount of non-aqueous organic polar solvent used can be in an amount of 2-20 times the weight of the tamarind gum v/w.

In an embodiment the amount of non-aqueous organic polar solvent used can be in an amount of 2-10 times the weight of the tamarind gum v/w.

Any alkali can be used in the process for preparing alkali metal salt of carboxyalkyl ether of tamarind gum. Any alkali compatible with etherifying agent and suitable to provide reaction condition for effective utilization of the etherifying agent can be used in the process for preparing alkali metal salt of carboxyalkyl ether of tamarind gum. Alkali used can be salt of an alkali metal including but not limited to sodium, potassium, calcium, magnesium or any other suitable alkali metal. Alkali used can be ammonia or ammonium salt. Alkali used in the process of the present disclosure can be selected from but not limiting to the group consisting of sodium hydroxide, potassium hydroxide, calcium hydroxide, magnesium hydroxide or the like, or the mixture thereof.

In an embodiment in the process for preparing alkali metal salt of carboxyalkyl ether of tamarind gum, the step of mercerizing the pulverized tamarind gum powder with alkali may be carried out at a suitable temperature, for example mercerization of pulverized tamarind gum powder with alkali may be carried out at 0° C. to 85° C. In an embodiment the mercerization of pulverized tamarind gum powder with alkali may be carried out at 25° C. to 85° C. In an embodiment the mercerization of pulverized tamarind gum powder with alkali may be carried out at 25° C. to 60° C.

In some embodiments the step of the mercerizing of the pulverized tamarind gum powder, is carried out by adding and mercerizing the pulverized tamarind gum powder in alkali mixed with the non-aqueous organic polar solvent in an amount at least 2 times the amount of the tamarind gum, under high speed shearing to convert the mixture to a slurry. In an embodiment, the step of the mercerizing of the pulverized tamarind gum powder, is carried out by adding and mercerizing the pulverized tamarind gum powder in alkali mixed with the non-aqueous organic polar solvent in an amount of about 2-10 times the amount of the starting tamarind gum, under high speed shearing of 20-30 rpm to convert the mixture to a slurry.

The step of mercerizing the pulverized tamarind gum powder with alkali is preferably carried out under agitation, for example under high speed shearing to convert the pulverized tamarind gum powder during the mercerizing step to slurry in the non-aqueous organic polar solvent. The particular high speed shearing apparatus employed is not particularly critical, provided that the tamarind gum powder is sufficiently transformed to slurry in the non-aqueous organic polar solvent. In a specific embodiment during the mercerization step a high speed shearing agitation apparatus is disposed in the reaction vessel, and the starting tamarind gum is sufficiently agitated.

In an embodiment, the mercerization can be carried out for a period of about 45 minutes to about 200 minutes. In an embodiment, the mercerization is carried out for a period of about 45 minutes to about 120 minutes.

Any suitable etherifying agent known to a person skill in the art may be used in the process of the present disclosure for alkali metal salt of carboxyalkyl ether of tamarind gum.

In an embodiment the etherifying agent used includes monochloroacetic acid, or salt of monochloroacetic acid for example sodium mono chloroacetate or potassium mono chloroacetate.

In an embodiment in the process for preparing alkali metal salt of carboxyalkyl ether of tamarind gum, involving separate steps of mercerizing the pulverized tamarind gum powder and etherification of tamarind gum-alkali mixture, the amount of the alkali used may be varied depending on the desired degree of substitution in the carboxyalkyl ether of tamarind gum. In one embodiment, the amount of alkali used may be in an amount of at least 1 mole per mole of etherifying agent. In one embodiment, the amount of alkali used may be in an amount of 1 mole-2 moles per mole of etherifying agent. In one specific embodiment, the amount of alkali used is in an amount of 1.2 moles-2 moles per mole of etherifying agent.

In an embodiment in the process for preparing alkali metal salt of carboxyalkyl ether of tamarind gum, involving mercerizing the pulverized tamarind gum powder and etherification carried simultaneously in the presence of an alkali, the amount of alkali used is varied depending on the desired degree of substitution in the carboxyalkyl ether of tamarind gum. In an embodiment, the amount of alkali used may be in a stoichiometric excess amount. In an embodiment the alkali used may be in an amount at least equimolar to the amount of etherifying agent. In order to perform alkali mercerization uniformly, it is preferred that the alkali be used in a substantial excess. In an embodiment, the alkali used may be 15 to 100 mole % excess, relative to the number of moles of etherifying agent. In an embodiment, the alkali used may be 25 to 100 mole % excess, relative to the number of moles of etherifying agent. In a specific embodiment, the alkali used may be 35 to 100 mole % excess, relative to the number of moles of etherifying agent.

In an embodiment in the process for preparing alkali metal salt of carboxyalkyl ether of tamarind gum, the amount of etherifying agent used during etherification is varied depending on the desired degree of substitution in the carboxyalkyl ether of tamarind gum and the amount of the alkali present in the reaction mixture. In an embodiment in the process for preparing alkali metal salt of carboxyalkyl ether of tamarind gum, the etherifying agent may be used in an amount of from about 0.2 moles-2.0 moles per mole of the starting tamarind gum. In an embodiment in the process for preparing alkali metal salt of carboxyalkyl ether of tamarind gum, the etherifying agent may be used in an amount of from about 0.5 moles-2.0 moles per mole of the starting tamarind gum.

In the process for preparing alkali metal salt of carboxyalkyl ether of tamarind gum, any suitable method can be adopted for addition of the etherifying agent. In the etherifying step, good results are obtained if the etherifying agent is sufficiently mixed with the alkali-tamarind gum and the reaction is conducted uniformly between them.

For carrying out reaction uniformly between the etherifying agent the alkali-tamarind gum, it is preferred that the alkali-tamarind gum be in a slurry state having good flow characteristics. In general, the etherification is conducted by mixing the etherifying agent with the flowable slurry under agitation by a suitable agitator. The example of suitable agitator includes an anchor type agitator, a high speed agitator having shearing propeller blades.

The etherification step can be carried out at temperature of above 50° C., preferably above 60° C. In an embodiment the etherification step is carried out at temperature of about 50°

C. to about 100° C. In an embodiment the etherification step is carried out at temperature of about 50° C. to about 85° C.

The etherification step can be carried for the period of about 45 minutes to about 450 minutes. In some of the embodiment the etherification step can be carried out for the period of about 45 minutes to about 360 minutes. In some embodiments the etherification step can be carried out for the period of about 45 minutes to about 240 minutes. In an embodiment the etherification step is carried out for the period of about 45 minutes to about 180 minutes.

The etherification when conducted under the same conditions, the viscosity characteristics of the resulting alkali metal salt of carboxyalkyl ether of tamarind gum are greatly influenced by the alkali mercerization conditions, and when the alkali mercerization is carried out according to the process of the present invention, alkali metal salt of carboxyalkyl ether of tamarind gum having high viscosity characteristics and high pseudo-plasticity and low thixotropic characteristics and being characterized by moderate but enhanced transparency compared to conventional process can be obtained.

The alkali metal salt of carboxyalkyl ether of tamarind gum obtained from the etherification step is separated from the reaction mixture by employing a suitable method for example centrifugation. The centrifugation can be carried out at a suitable speed for efficient separation of the alkali metal salt of carboxyalkyl ether of tamarind gum from the reaction mixture, for example at about 400 rpm to about 800 rpm. In some embodiments the centrifugation can be carried out for the time period for the separation of the alkali metal salt of carboxyalkyl ether of tamarind gum from the reaction mixture to the maximum extent possible, for example for the period of about 30 minutes to 150 minutes. In an embodiment the centrifugation can be carried out for the period of about 30 minutes to 90 minutes. In an embodiment the centrifugation is carried out for the period of about 30 minutes to 60 minutes.

The alkali metal salt of carboxyalkyl ether of tamarind gum separated from the reaction mixture may be dried by subjecting the alkali metal salt of carboxyalkyl ether of tamarind gum separated from the reaction mixture to a suitable drying technique for example, vacuum drying which can be carried out at a suitable temperature so as to remove the moisture to the desired extent. The alkali metal salt of carboxyalkyl ether of tamarind gum can be obtained in the dried form by carrying out drying for example by vacuum drying at a temperature of from about 45° C. to about 85° C. In an embodiment the alkali metal salt of carboxyalkyl ether of tamarind gum can be obtained in the dried form by subjecting the alkali metal salt of carboxyalkyl ether of tamarind gum separated from the reaction mixture to drying under vacuum at a temperature from about 45° C. to about 60° C. Vacuum drying can be carried out for the time period sufficient to provide the dried alkali metal salt of carboxyalkyl ether of tamarind gum with the desired moisture content. In an embodiment the alkali metal salt of carboxyalkyl ether of tamarind gum separated from the reaction mixture may be dried for example under vacuum from about 100 minutes to about 300 minutes. In an embodiment the vacuum drying may be carried out for about 120 minutes to about 240 minutes.

The alkali metal salt of carboxyalkyl ether of tamarind gum in the dried from with the desired moisture content may be blended to obtain uniform constitution. Blending may be carried out using appropriate equipment for example conical blender. Blending may be carried out for example at temperature of about 45° C. to about 85° C. Blending may be carried out for about 90 mins to about 300 mins. In an embodiment the blending is carried out at temperature from about 45° C. to about 85° C. for about 90 minutes to about 250 minutes.

The dried alkali metal salt of carboxyalkyl ether of tamarind gum powder can be sieved through sieve of appropriate mesh size to obtain the powder of desired particle size. The dried alkali metal salt of carboxyalkyl ether of tamarind gum powder is passed through sieve of 100 mesh to 325 mesh to obtain powder having average particle size ranging from about 140 microns to about 44 microns. In an embodiment the dried alkali metal salt of carboxyalkyl ether of tamarind gum powder is passed through the sieve having mesh size of 200 to 350 mesh size to obtain the powder having average particle size ranging from about 74 microns to 44 microns. In an embodiment the dried alkali metal salt of carboxyalkyl ether of tamarind gum powder is passed through sieve of 200 mesh to 270 mesh to obtain more than 90% powder having particle size in the range of about 74 microns to 53 microns. As per one of the embodiment, in accordance with the process of the present disclosure, the inventors were surprisingly able to obtain about 90% to 95% powder of the dried alkali metal salt of carboxyalkyl ether of tamarind gum having particle size ranging from 60 micron to 50 microns.

Figure 1:
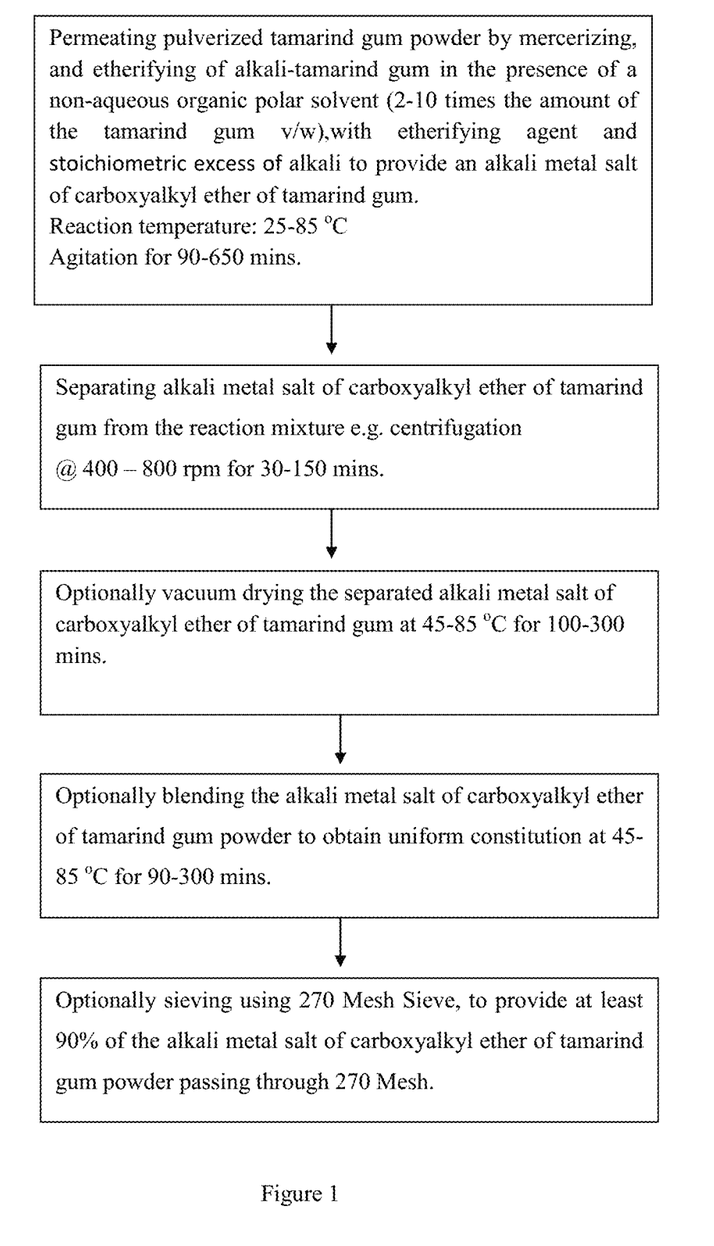
FIG. 1 is a flow chart depicting the process for preparing the alkali metal salt of carboxyalkyl ether of tamarind gum as per some of the exemplary embodiment.

The exemplary method for preparing the alkali metal salt of carboxyalkyl ether of tamarind gum as per some of the embodiments is illustrated by a flow chart in FIG. 1.

Figure 2:
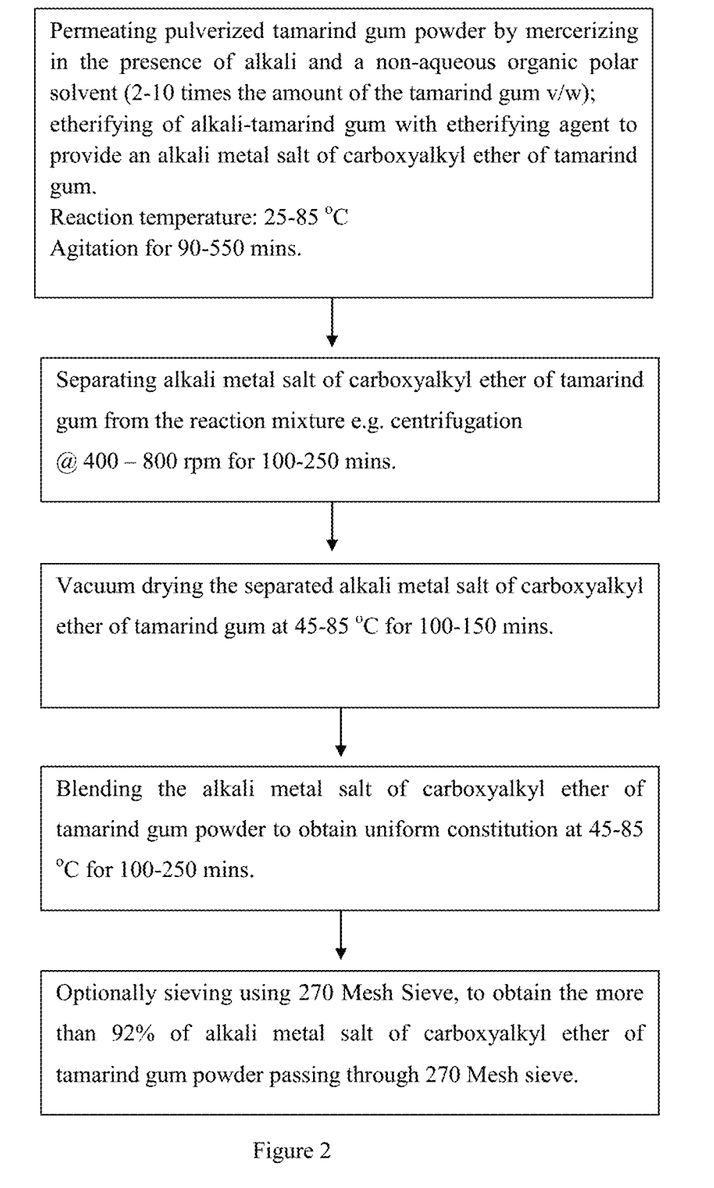
FIG. 2 is a flow chart depicting the process for preparing the alkali metal salt of carboxyalkyl ether of tamarind gum as per some of the exemplary embodiment.

The exemplary method for preparing the alkali metal salt of carboxyalkyl ether of tamarind gum as per some of the embodiments is illustrated by a flow chart in FIG. 2.

The alkali metal salt of carboxyalkyl ether of tamarind gum provided in accordance with the present disclosure, as compared to the conventional product, has better properties in respect of reduced formation of lumps, excellent in the flow characteristics, pseudoplastic characteristics, and viscosity characteristic is obtained.

The alkali metal salt of carboxyalkyl ether of tamarind gum provided in accordance with the present disclosure possesses degree of substitution ranging from 0.01 to 1. In an embodiment the alkali metal salt of carboxyalkyl ether of tamarind gum provided in accordance with the present disclosure possesses degree of substitution ranging from 0.01 to 0.1.

The alkali metal salt of carboxyalkyl ether of tamarind gum provided in accordance with the present disclosure is cold water soluble.

The alkali metal salt of carboxyalkyl ether of tamarind gum provided in accordance with the present disclosure exhibits a viscosity higher than 20 cps at 10 rpm, 30° C. in a 1% solution (Brookfield). As per some embodiments of the present disclosure the alkali metal salt of carboxyalkyl ether of tamarind gum provided exhibits a viscosity higher than 100,000 cps at 10 rpm, 30° C. in a 10% solution (Brookfield).

The alkali metal salt of carboxyalkyl ether of tamarind gum provided in accordance with the present disclosure is compatible to viscosity build up and stability in pH 1 to 14 exhibiting excellent pseudo-plastic shear thinning flow rheology.

The alkali metal salt of carboxyalkyl ether of tamarind gum provided in accordance with the present disclosure exhibits enhanced filterability. In an embodiment the alkali metal salt of carboxyalkyl ether of tamarind gum exhibits filterability beyond 18 grams total solid passing through a 12 mm diameter aperture 50 micron SS Mesh under 0.5 bar vacuum.

The present disclosure provides an alkali metal salt of carboxyalkyl ether of tamarind gum with one or more characteristic(s) selected from pseudo-plastic flow property in aqueous solutions, increased viscosity at lower concentrations, high resistance to drop in viscosity in presence of electrolytes, high resistance to drop in viscosity in presence of concentrated acids, high resistance to drop in viscosity in presence of strong alkali, ability to hydrate and hold viscosity under a pH range from pH 1 to pH 14.

In an embodiment, the present disclosure provides an alkali metal salt of carboxyalkyl ether of tamarind gum suitable for industrial application for example use in textile printing pastes.

The alkali metal salt of carboxyalkyl ether of tamarind gum according to the present disclosure possesses an improved pseudo-plastic flow property in aqueous solutions and increased viscosity at lower concentrations compared to the conventionally followed production route. The alkali metal salt of carboxyalkyl ether of tamarind gum according to the present disclosure shows high resistance to drop in viscosity in presence of electrolytes, high resistance to drop in viscosity in presence of concentrated Acids, high resistance to drop in viscosity in presence of strong alkali, ability to hydrate and hold viscosity under a wide pH range from pH 1 to pH 14. The alkali metal salt of carboxyalkyl ether of tamarind gum according to the present disclosure hence can be suitable for use in textile printing pastes, water based paint formulations, construction chemical formulations for example tile adhesive formulations, burst factor and retention aid in paper applications.

The alkali metal salt of carboxyalkyl ether of tamarind gum according to the present disclosure excellent properties such as a thickening property, a suspension-stabilizing property and a film-forming property, and it can be utilized in the fiber industry, the food processing industry, the paint industry, the construction material industry, the cosmetic industry, the ceramic industry, the pharmaceutical industry, agricultural industry, home care industry, the detergent industry, in drilling muds used in the boring of oil wells and other such applications requiring the material with characteristics exhibited by the alkali metal salt of carboxyalkyl ether of tamarind gum according to the present disclosure.

The exemplary application of the alkali metal salt of carboxyalkyl ether of tamarind gum obtained by the process of the present disclosure owing to its characteristics include use in a printing paste for good reproducibility of the printing results; in paint formulation for providing excellent pseudo plastic flow rheology and thickener; in cosmetic formulations as an effective stabilizer, emulsifier, rheology aid and thickener; in auto care formulations as a oil in water emulsifier and emulsion stabilisier; in paper industry as a burst factor and retention aid; in home care formulations as a bio-degradable acid thickener, emulsifier and rheology modifier; in detergent formulations as an anti-reposition polymer; in tile adhesive formulations as a shear strength improver; as a solubilizer and thickener for strong reducing agents; in ceramic industry as an effective binding agent; as a defoamer in preparation of textile auxiliaries, and as a bio-degradable polymer replacement for acrylic acid based thickeners in textile printing.

The present disclosure in accordance with the process disclosed herein advantageously provides much superior alkali metal salt of carboxyalkyl ether of tamarind gum as compared to the conventional or hitherto known processes owing the characteristics possessed by it for example, improved flow characteristics, pseudoplastic characteristics, and high viscosity characteristics, with stability to acids, alkalis, electrolytes.

The present disclosure relates to a simple, cost effective and efficient process for preparing alkali metal salt of carboxyalkyl ether of tamarind gum. The present invention satisfies the existing needs, as well as others, and generally overcomes the deficiencies found in the existing art.

While the foregoing description discloses various embodiments of the disclosure, other and further embodiments of the invention may be devised without departing from the basic scope of the disclosure. The invention is not limited to the described embodiments, versions or examples, which are included to enable a person having ordinary skill in the art to make and use the invention when combined with information and knowledge available to the person having ordinary skill in the art.

EXAMPLES

The present disclosure is further explained in the form of following examples. However, it is to be understood that the foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

Example 1

Figure 3:
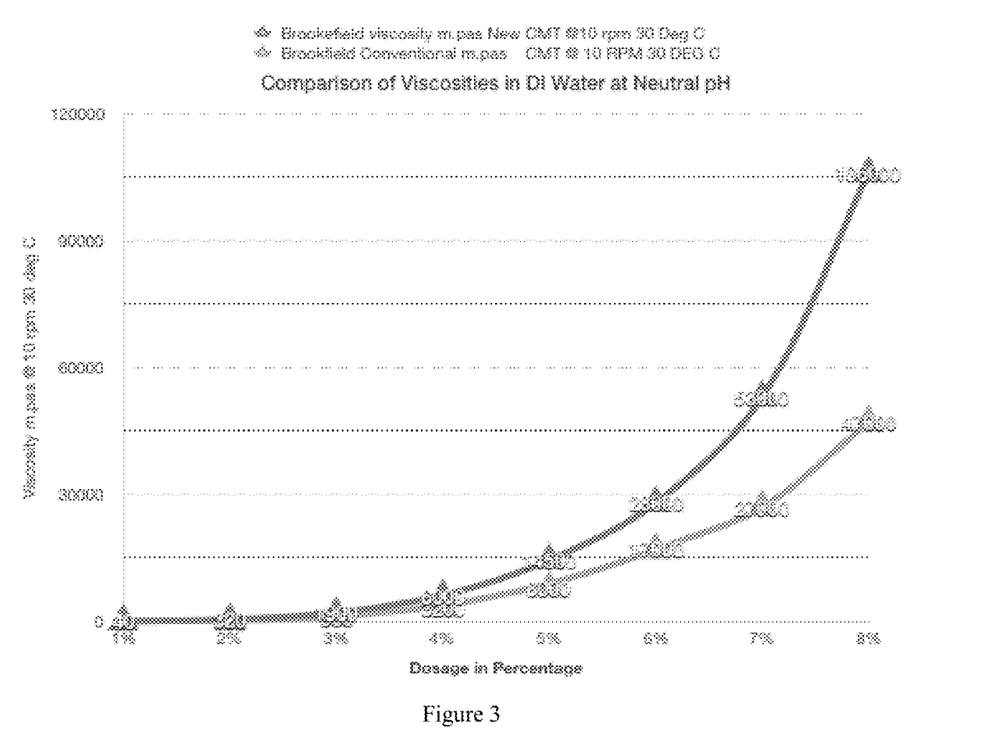
FIG. 3 is a graph illustrating the comparison of viscosity of the conventional CMT (indicated as "CMT"), and CMT obtained as per one of the exemplary embodiment (indicated as "New CMT") in D1 Water at neutral pH.
Figure 4:
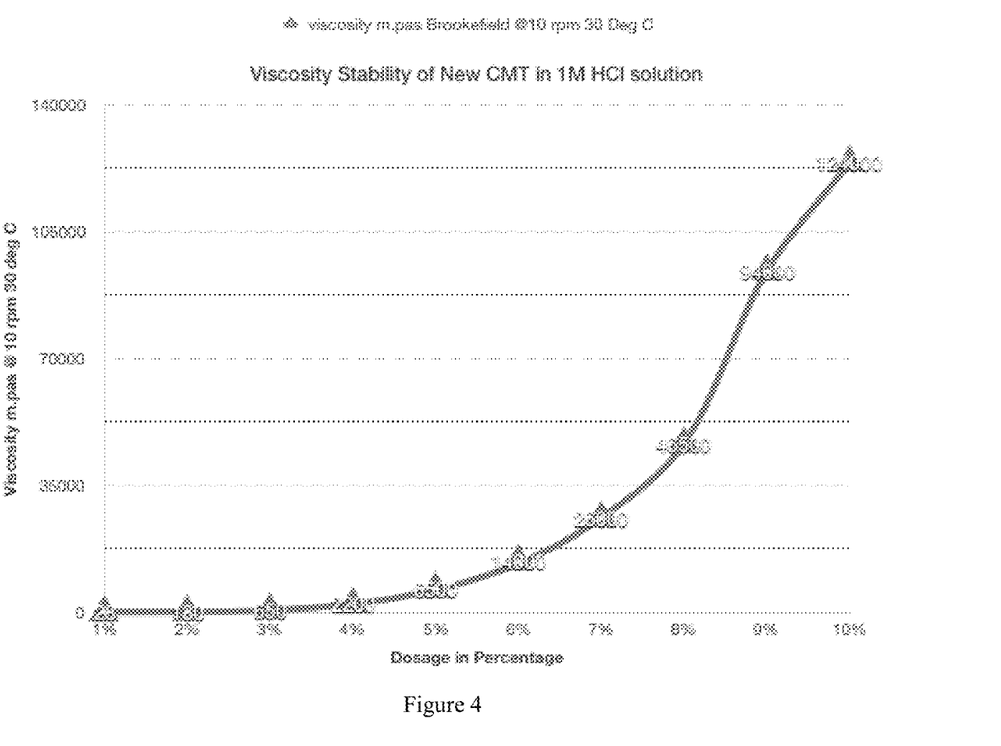
FIG. 4 is a graph illustrating the viscosity profile of the CMT obtained as per one of the exemplary embodiment in 1M HCl solution.
Figure 5:
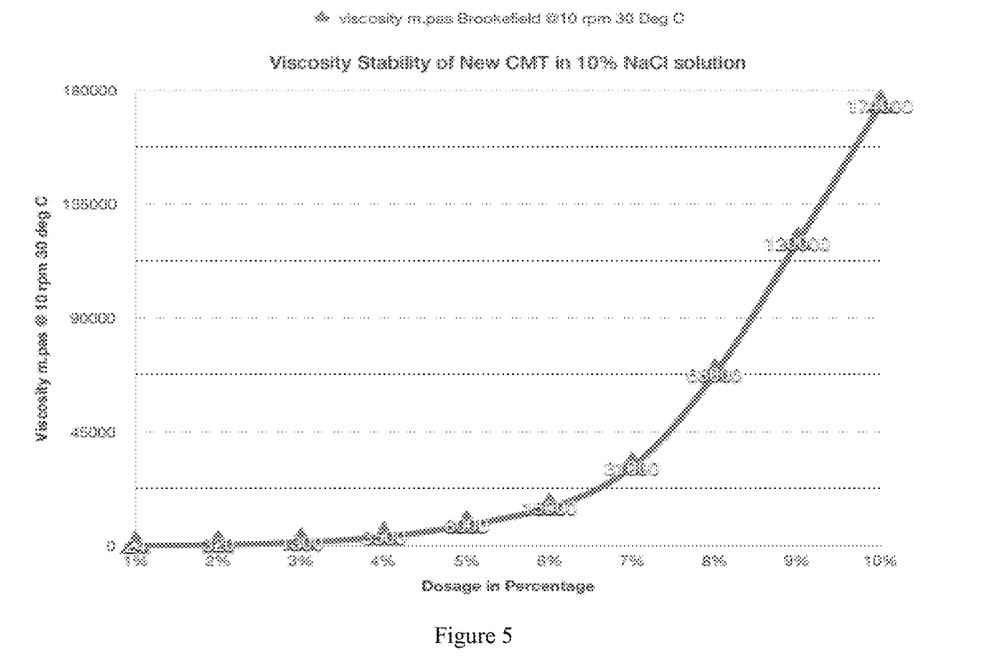
FIG. 5 is a graph illustrating the viscosity profile of the CMT obtained as per one of the exemplary embodiment in 10% NaCl solution.
Figure 6:
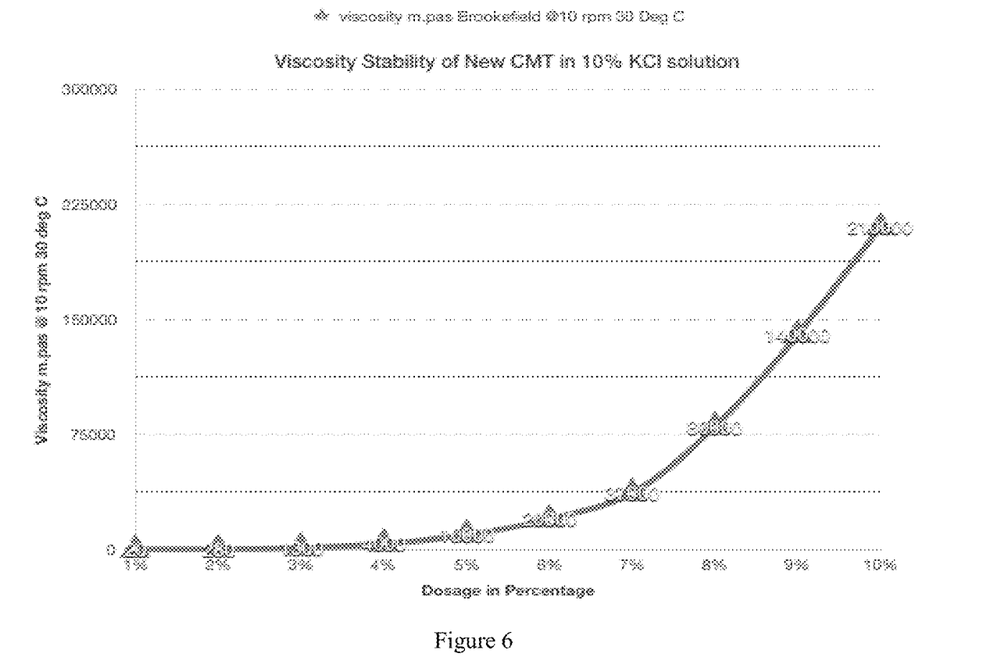
FIG. 6 is a graph illustrating the viscosity profile of the CMT obtained as per one of the exemplary embodiment in 10% KCl solution.
Figure 7:
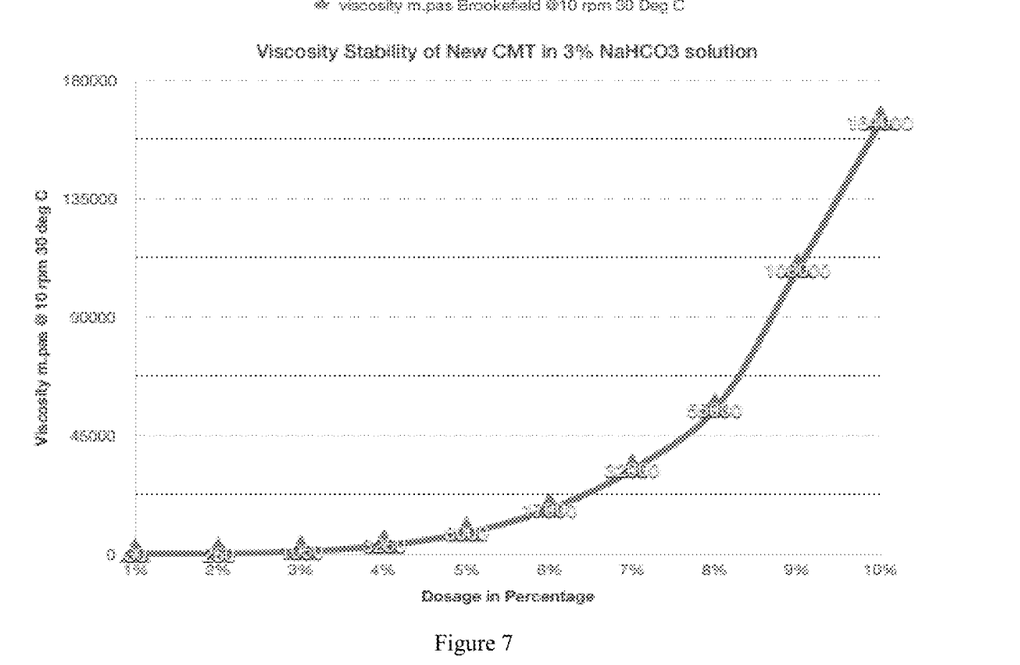
FIG. 7 is a graph illustrating the viscosity profiles of the CMT obtained as per one of the exemplary embodiment in 3% NaHCO$_3$ solution.
Figure 8:
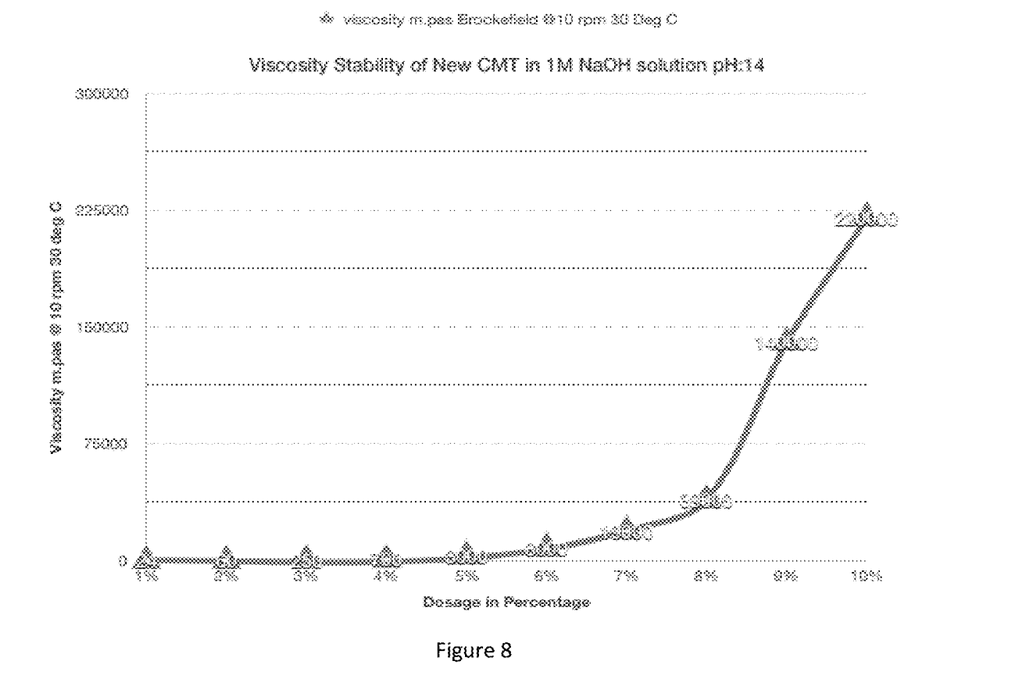
FIG. 8 is a graph illustrating the viscosity profiles of the CMT obtained as per one of the exemplary embodiment in 1M NaOH solution.

Process for Preparing Sodium Salt of Carboxymethyl Ether of Tamarind Gum:

In practicing the process including mercerization and subsequent etherification, the starting material, i.e. tamarind gum powder procured from commercial vendor was tested for its contents like carbohydrates, protein, and oil which was found to be 65-72%, 15.4-22.7%, and 1 to 8.2% respectively. Commercially procured gum powder was passed through sieves to having particles size passing through sieve of 270 mesh to 300 mesh. Tamaring gum powder with more than 90% passing through sieve of 270 mesh (1 KG) was added to the mixture of methyl alcohol (2.3 Kg), sodium hydroxide (50 Grams), hydrogen peroxide (0.1 g Gram) in a reaction vessel, and the alkali mercerization was carried out at 60° C. A high speed shearing agitation apparatus with having shearing propeller blades was disposed in the reaction vessel, and during the alkali mercerization step, the starting tamarind gum was sufficiently agitated for 90 minutes to transform the tamarind gum powder to a slurry of the tamarind gum-alkali in methyl alcohol. an etherifying agent, i.e. sodium monochloroacetate (100 Grams), was added to the thus obtained tamarind gum-alkali slurry, and the temperature was elevated above 60° C., but less than 100° C., preferably at 60° C. to 80° C., and the etherification is carried out for 120 minutes to provide sodium salt of carboxymethyl ether of tamarind gum. Thus obtained sodium salt of carboxymethyl ether of tamarind gum was separated from the reaction mixture with the help of centrifuge by carrying out centrifugation at 400 RPM to 800 RPM for 45-60 minutes. The separated sodium salt of carboxymethyl ether of tamarind gum was dried in a vacuum dryer at 45° C. to 85° C. The dried powder obtained was blended in blender for example in conical blender for about 120-240 minutes to obtain uniform powder of sodium salt of carboxymethyl ether of tamarind gum, which was then passed through sieve of 270 mesh to provide uniform powder of sodium salt of carboxymethyl ether of tamarind gum. The yield obtained was more than 95% of the starting material. The obtained sodium salt of carboxymethyl ether of tamarind gum was subjected to various testing and analysis to check characteristics like solubility, degree of substitution, particle size, viscosity, etc. The sodium salt of carboxymethyl ether of tamarind gum was found to be cold water soluble, more than 92% of the powder having particle size in the range of 50-60 microns, having degree of substitution 0.01 to 0.1 and much better viscosity as compared to the conventionally obtained sodium salt of carboxymethyl ether of tamarind gum. The sodium salt of carboxymethyl ether of tamarind gum obtained as per this example (indicated as new CMT) showed much superior viscosity of more than 100,000 cps at 10 rpm, 30° C. in a 10% solution (Brookfield), as compared to conventional sodium salt of carboxymethyl ether (conventional CMT) of tamarind gum in water exhibiting only around 4000 cps at 10 rpm, 30° C. in a 10% solution (Brookfield) (FIG. 3). The sodium salt of carboxymethyl ether of tamarind gum obtained as per this example showed much superior viscosity of more than 100,000 cps at 10 rpm, 30° C. (Brookfield) at wide range of pH ranging from 1-14 for example in 1M HCl, 10% NaCl, 10% KCl, 3% Sodium bi-carbonate solution and 1M NaOH as seen from FIGS. 4-8 respectively.

I claim:

1. A process for preparing an alkali metal salt of carboxyalkyl ether of tamarind gum comprising:
   (a) mercerizing a pulverized tamarind gum powder in the presence of an alkali, and a non-aqueous organic polar solvent present in an amount of at least 2 times the amount of the tamarind gum v/w;
   (b) carrying out etherification of the alkali-tamarind gum with an etherifying agent to provide the alkali metal salt of carboxyalkyl ether of tamarind gum;
   in which, the steps of mercerizing the pulverized tamarind gum powder and etherification are carried out separately or simultaneously.

2. The process as claimed in claim 1, wherein the steps of mercerizing the pulverized tamarind gum powder and etherification are carried out separately.

3. A process for preparing alkali metal salt of carboxyalkyl ether of tamarind gum comprising: mercerizing a pulverized tamarind gum powder; and etherifying the pulverized tamarind gum powder in a non-aqueous organic polar solvent present in an amount of at least 2 times the amount of the tamarind gum v/w, with an etherifying agent, in the presence of a stoichiometric excess of an alkali.

4. The process as claimed in claim 1, wherein the process further comprises at least one of step(s) of separating the alkali metal salt of carboxyalkyl ether of tamarind gum from the reaction mixture; drying the separated alkali metal salt of carboxyalkyl ether of tamarind gum; blending the dried alkali metal salt of carboxyalkyl ether of tamarind gum; and sieving the dried alkali metal salt of carboxyalkyl ether of tamarind gum through sieve of 100-400 mesh size to obtain more than 90% of dry powder of alkali metal salt of carboxyalkyl ether of tamarind gum with particle size of 50-60 micron.

5. The process as claimed in claim 1, wherein the non-aqueous organic polar solvent does not contain water and the polar solvent is selected from alcohol(s) having 1 to 4 carbon atoms; and ketone(s) having 3 to 5 carbon atoms; or mixtures thereof; wherein the alcohol is selected from the group consisting of methyl alcohol, ethyl alcohol, n-propyl alcohol, isopropyl alcohol, n-butyl alcohol and isobutyl alcohol; and the ketone is selected from the group consisting of acetone and methylethyl ketone.

6. The process as claimed in claim 1, wherein the amount of non-aqueous organic polar solvent used can be in an amount of 2-10 times the weight of the tamarind gum v/w.

7. The process as claimed in claim 1, wherein the amount of alkali used is from 1 mole-2 moles per mole of etherifying agent.

8. The process as claimed in claim 3, wherein the amount of alkali used is from 15 to 100 mole % excess relative to the number of moles of etherifying agent.

9. The process as claimed in claim 1, wherein the etherifying agent is selected from the group consisting of monochloroacetic acid, sodium mono chloroacetate, and potassium mono chloroacetate.

10. The process as claimed in claim 1, wherein the amount of the etherifying agent used is from 0.2 moles-2.0 moles per mole of the starting tamarind gum.

11. The process as claimed in claim 1, wherein the step of the mercerizing of the pulverized tamarind gum powder in alkali mixed with the non-aqueous organic polar solvent is carried out under high speed shearing 20-30 rpm to convert the mixture to a slurry.

12. The process as claimed in claim 1, wherein the mercerization of pulverized tamarind gum powder with alkali is carried out at 25° C. to 60° C.

13. The process as claimed in claim 1, wherein the etherification step is carried out at temperature of about 50° C. to about 80° C.

* * * * *